Aug. 15, 1967  R. F. LENSE  3,335,768
TILTABLE MULTIPLE AUGER FILLER
Filed May 21, 1965  2 Sheets-Sheet 1

INVENTOR
Robert F. Lense
by Wolfe, Hubbard, Voit & Osann
ATTORNEYS

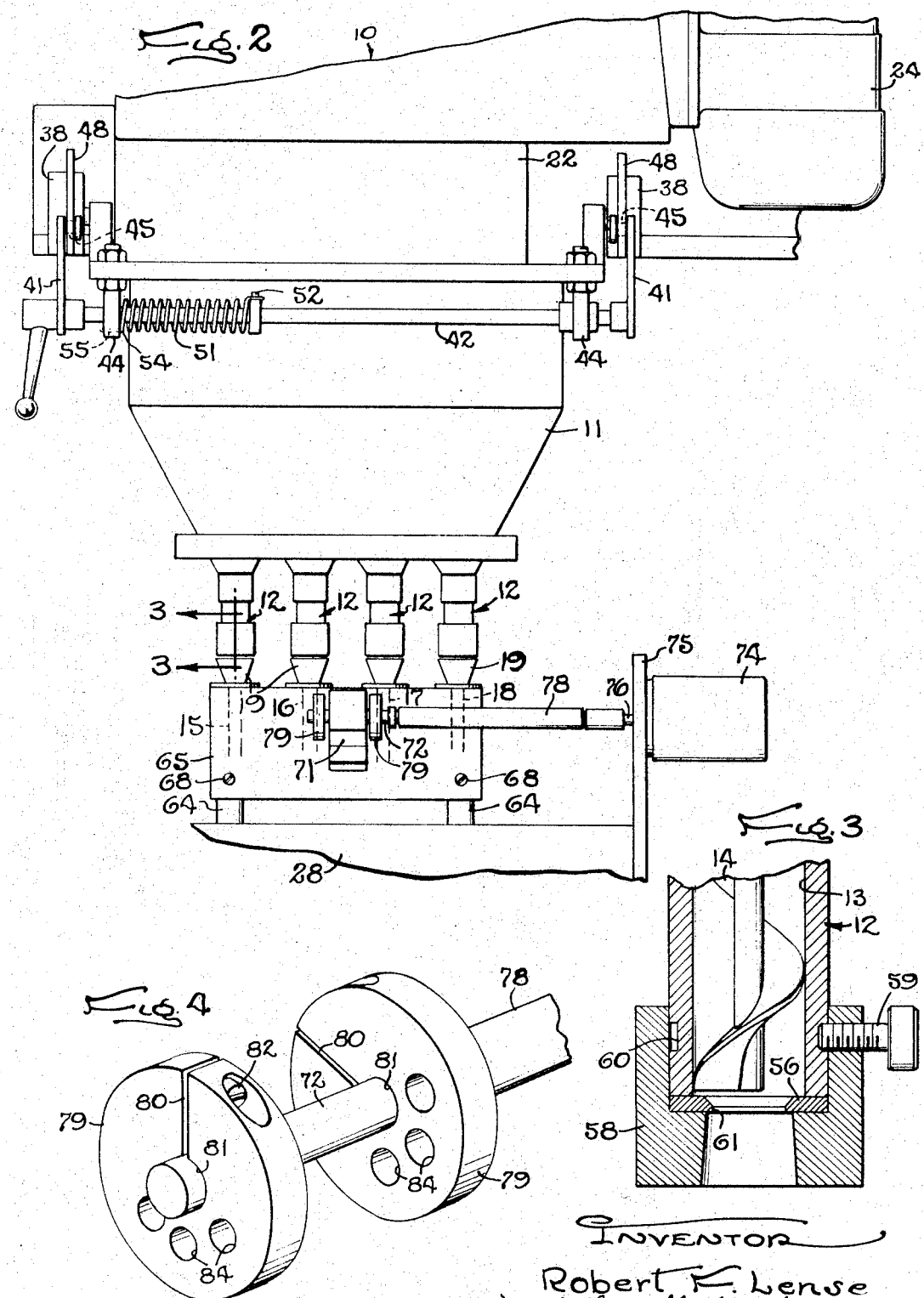

United States Patent Office 3,335,768
Patented Aug. 15, 1967

3,335,768
TILTABLE MULTIPLE AUGER FILLER
Robert F. Lense, Rockford, Ill., assignor to Bartelt Engineering Company, Inc., Rockford, Ill., a corporation of Delaware
Filed May 21, 1965, Ser. No. 457,686
10 Claims. (Cl. 141—284)

ABSTRACT OF THE DISCLOSURE

A device for dispensing material into a receptacle and including a series of rotatable augers telescoped into the discharge spouts of a hopper and operable to deliver the material from the hopper, through the spouts and into a series of tubes leading to the receptacle, the tubes being vibrated to produce a smooth flow of material. The hopper is mounted for tilting between a position in which the spouts are alined with the tubes to deliver the material to the latter, and a position in which the spouts are moved away from the tubes to permit removal of the augers from the spouts without interference from the tubes. A flow-restricting plate disposed in each spout prevents free gravitational flow of the material through the spout and insures that the amount of material dispensed from the spout is correlated with the amount delivered by the rotating auger.

Background of the invention

This invention relates to a dispensing device for discharging a product in the form of a fluent material from a hopper and into a receptacle. More particularly, this invention relates to a dispensing device of the type having a rotatable auger for dispensing a measured quantity of the product from the hopper and transporting the product to a container spaced therefrom.

Summary of the invention

The general object of this invention is to provide a universal dispensing device which may be used to dispense different kinds of materials or articles, and which may be used for dispensing into different types of containers, with little change in the device and equal efficiency of operation.

A more specific object of this invention is to provide an improved and more accurate means for feeding a measured quantity of product through the spout by making the product flow be directly proportional to the amount of rotation of the auger.

Another object of this invention is to provide an improved means for conducting a smooth and even flow of the product between the hopper and the container, the rate of flow being readily adjustable for optimum operation with the particular product being dispensed.

Still another object of this invention is to support the hopper for quick and easy movement out of the way for adjustment or repair of the dispensing device, and to facilitate removal and replacement of the container and other apparatus associated with the dispensing operation.

Brief description of the drawings

FIG. 2 is a fragmentary cross-sectional view along the line 2—2 of FIG. 1;

FIG. 3 is an enlarged fragmentary cross-sectional view of the spout and auger taken along the line 3—3 of FIG. 2;

FIG. 4 is an enlarged fragmentary perspective view of the shaft and attached weights of the vibrating apparatus.

Detailed description

Figure 1:
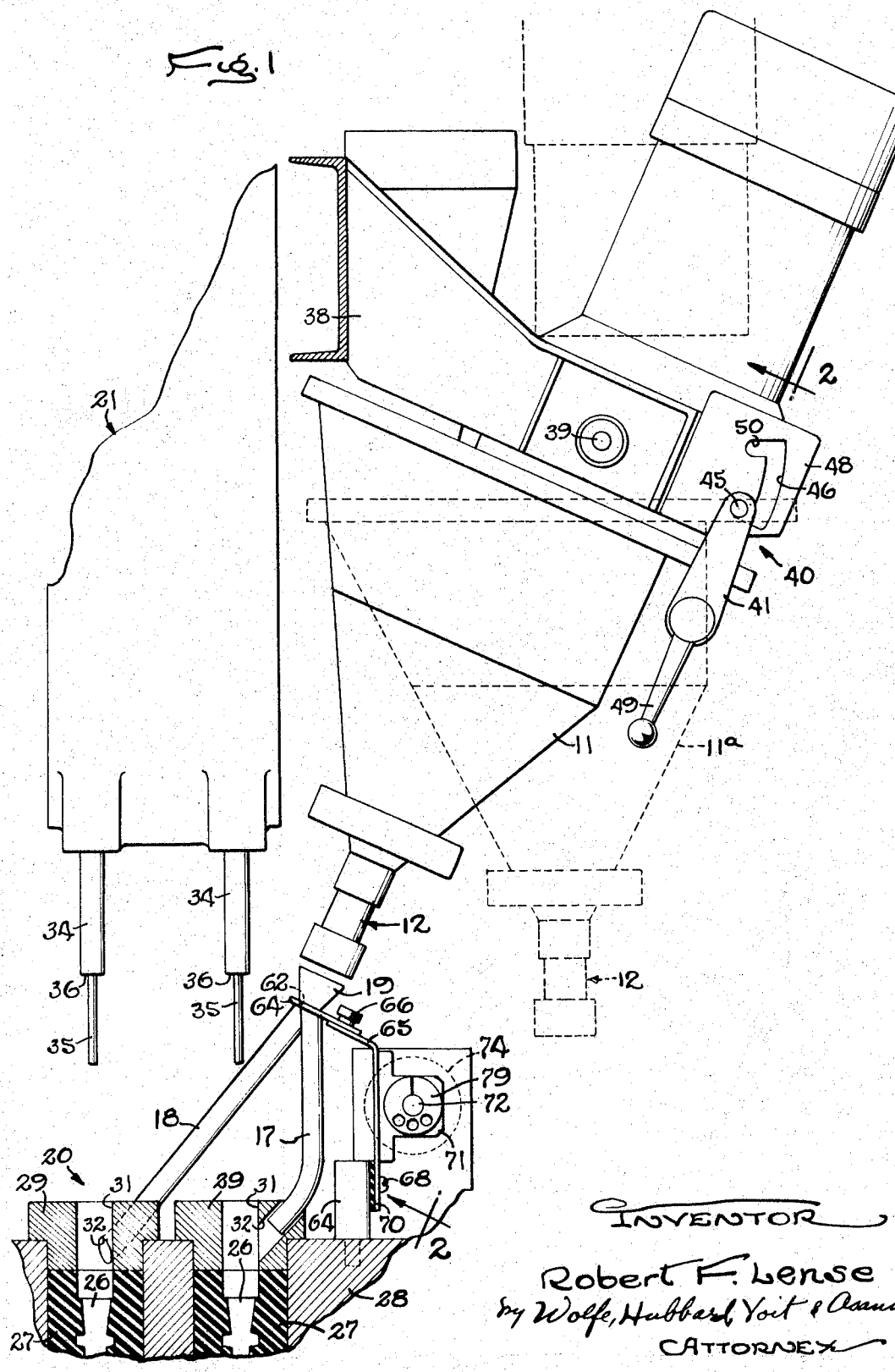
FIGURE 1 is a side elevational view of the dispensing device and container, partially in section, showing the hopper in a moved position in dotted outline.

For purposes of illustration, the invention is shown in the drawings embodied in a dispensing and volumetric measuring device 10 (FIGS. 1 and 2) comprising a hopper 11 for storing a product to be dispensed through a plurality of hollow, open ended spouts 12 supported on the underside of the hopper. The product is transmitted through center openings 13 in each spout (see FIG. 3) by a rotating auger 14, and drops through a lower open end of each spout into four conduits or tubes 15, 16, 17 and 18, each alined with one spout and including a large funnel mouth 19 to receive the product. The hopper is positioned above and to one side of a receptacle 20 into which the product is being dispensed since it is necessary to position a press 21 directly above the receptacle for a purpose to be explained later. The augers 14 are driven by an arrangement of gears (not shown) in a gear box 22 supported above the hopper and powered by an electric motor 24 (FIG. 2).

In the embodiment herein dsceribed, the product being dispensed is a powdered ceramic material which is fed into cavities 26 in the receptacle to thereafter be compacted into a spark plug body which is then removed and baked to fuse the material. The receptable includes four such cavities 26, only two of which are shown, with two in each of the two blocks 27 (see FIG. 1) which are made of a resilient material, such as rubber and supported in bores spaced longitudinally in a bed frame 28. Caps 29 fit over the top of each of the blocks and partially down into the bores.

Each cap 29 includes an open-ended well 31 alined with each cavity 26, with a passage 32 extending obliquely to each well up to the top surface of the cap to receive the lower end of one of tubes 15, 16, 17 and 18. These tubes are curved to extend upward to a position directly beneath one of the spouts and receive material therefrom which passes therethrough to fall through the wells 31 and into the cavities 26. After the cavities are filled with a measured volume of the material, a spindle 34 supported in a vertical position over each well by the press 21, is forced into the well to drive a core 35 through the material. Concurrent with the passage of the core into the cavity, a shoulder 36 on the spindle presses downward on the material from the top to compact it within the cavity and around the core. Pressure is thereafter applied to the outside of the blocks 27 by some suitable means (not shown), such as by introducing high pressure fluid through the bed 28 to compress the resilient blocks with a force of about 8000 p.s.i. and further compact the material in the cavities. The pressure is then removed from the blocks and the spindle withdrawn from the well with the now compacted spark plug body remaining on the core, which may be removed from the core after the spindle is raised to the position shown in FIG. 1.

In accordance with one feature of the invention, for ease of removal and replacement of the augers in the dispensing device and to facilitate general repair, adjustment and cleaning of the device, the hopper is supported in a manner to permit pivotal movement thereof from the tilted position to a vertical position to move the spouts out of alinement with the funnels 19. For this purpose, the hopper is supported on a frame 38 by shafts 39 which extend into bearing blocks 38a on the hopper frame to allow pivoting of the hopper about the axis of the shaft between the two positions shown in FIG. 1. The spouts may thereby be alined with the top end 19 of the funnel tubes, as shown by the solid line drawing, or may be swung away from the tubes to a second position, as shown in broken line at 11a. When pivoted to the vertical or broken line position 11a, the elongated augers may be withdrawn from the hopper through the spouts without disturbing the container or other mechanism which might otherwise be in the way.

To hold the hopper in either of these two positions, a locking mechanism 40 is provided comprising a pair of locking levers 41 rotatably supported on each side of the hopper 11 by a shaft 42 (FIG. 2) journaled in brackets 44 attached to the hopper. Extending towards the hopper from each locking lever is a pin 45 which fits through an aperture 46 in a plate 48 supported on the frame adjacent each locking lever. The hopper may be pivoted to either of the two positions and, by movement of a handle 49 counter clockwise to move the pins into slots 50 opening into the aperture 46, and then alined with the pins, the hopper may be locked in the position selected. To bias the shaft and locking lever in the counter clockwise direction (looking at FIG. 1) and hold the pins in the slots 50, a spring 51 (FIG. 2) is positioned around the shaft 42 with one end secured to a clamp 52 on the shaft and the opposite end attached to one of the brackets 44 by passage of an end 54 through an opening 55 in the bracket. After grasping the handle and swinging it clockwise to move the pins out of the slots, the hopper may be pivoted to the other position and locked therein by release of the handle.

With the spouts alined with the funnel tubes and the augers rotating, material is carried from the hopper through the spouts 12 into the tubes 15–18 and hence into the cavities 26. For accurate dispensing of the material, the amount passing through the spouts must be proportional to the speed the auger is turned so that the auger may be turned a given length of time to dispense a predetermined amount of the material. Some types of material flow much more freely than others, for instance materials that is powdered and dry may actually flow through the continuous screw path of the auger and out the spout faster than the auger is actually pushing it through the flow area of the auger, thereby making the volume of the material dispensed disproportionate with the turning of the auger.

It is another feature of this invention to provide means for accurately dispensing the material through the spout, even though it may be in a free flowing state, by restricting the flow of material so that the amount actually dispensed is directly proportional to the turning of the auger. For this purpose, a flow restriction plate 56 (FIG. 3) is positioned across the outlet or bottom end of each spout between the spout open end and the auger, and is supported in place by a removable extension 58 which fits over the end of the spout. This extension 58 is held on the spout by a lock screw 59 which is tightened into a groove 60 extending around the spout. The restriction plate includes an aperture 61 having a cross-sectional area less than the flow area of the auger, that is, the cross-sectional area of the passage along the auger for carrying the product. By this construction the effect of gravity pull on the flow through the auger is lessened since the material tends to pile up and fill the area above the aperture. Although the amount of material carried by the auger may be reduced somewhat, flow of the material through the spout is directly proportional to the amount forced through the plate aperture by the turning of the auger. The plate and extension are removable for cleaning and replacement which is especially important in the subject embodiment where the ceramic material dispensed, being very abrasive, wears away the plate as it passes through the aperture. Where other products are to be dispensed, plates with apertures of other sizes may function better and this construction allows for easy replacement of the plate.

Frequently, because of the characteristics of the material being dispensed, the material flowing in the funnel tubes will pile up and not flow evenly to the containers. This is especially true of ceramic material in which the particles tends to cling together and also collect on the tube walls causing underfilling of the receptacle cavities. After the weight of the material collected in the tubes builds up sufficiently, it lets go all at once to overfill the receptacle and make the volumetric dispensing of the material inaccurate. In accordance with this aspect of the invention, a smooth flow of the material through the tubes is effected by vibrating the tubes to prevent the material from collecting therein and for this purpose, apparatus for vibrating the tubes is connected to the tubes, this apparatus being easily adjustable for vibrating the tubes at different amplitudes to effect optimum flow of the material through the tubes.

To these ends, the funnel tubes are supported at the upper ends in openings 62 in a plate 64, the openings being sized for a snug fit with the tubes. This plate is in turn attached to a bracket 65 by a thumbscrew 66 so that it can be positioned to aline the tubes with the spouts and receptacle. The bracket is attached by screws 68 to a pair of upright members 69 supported on the bed 28. Resilient washers 70 are positioned between the bracket 65 and the upright members 64 which permit some freedom of movement therebetween and also limit the vibratory forces transmitted from the bracket to the frame.

The vibrating apparatus further includes a bearing housing 71 attached to the side of the bracket 65 in which is journaled a shaft 72 extending parallel to the bracket and plate 65 (FIGS. 1 and 2). This shaft is rotated by a motor 74, supported on a base plate 75 attached to the frame, having a shaft 76 connected to shaft 72 by a flexible coupling 78. Attached to the shaft 72 are a pair of unbalanced weights 79 (FIGS. 1, 2 and 4) which are annular in shape and include a slot 80 along one radius extending from the center opening 81 to the outer surface. Each weight is secured to the shaft by a screw 82 extending through an opening in the weight to one side and normal to the slot 80 and threaded into the weight on the other side of the slot in a manner to pull the sides of the slot towards each other, and thereby clamp the edges of the center opening 81 against the shaft. The weights are unbalanced about the center opening (and therefore about the supporting shaft) by drilling a number of holes 84 in one sector thereof. In the present embodiment three holes of the size and location shown have proved sufficient for vibrating the tubes.

To vibrate the funnel tubes, the motor 74 is energized to drive the shaft 72 and unbalanced weights at a relatively high speed which vibrates the bearing housing 71. The virbration causes the upward extending ends of the brackets 65 and the supported plate 64 to oscillate back and forth sharply which shakes the tubes. The tubes thus shake freely, since they fit loosely within the passages 32, to effect a free flow of material from the spouts to the wells 31 and thereafter into the cavities 26. Since the material flows freely, the receptacle filling is not only made more accurate, but is speeded up to provide for a more efficient use of the machine. Different materials and differently shaped tubes may require a greater or lesser amplitude of vibration and with the two weights 79 attached in the manner described, angular repositioning of one with respect to the other about the supporting shaft 72 permits adjustment of the amplitude of vibration. In this manner the amplitude and, if the unbalanced sectors of the weights are angularly spaced sufficiently to effect more than one vibratory movement during each revolution, the frequency of the vibratory force may be adjusted to meet the particular need.

In the manner heretofore described, an improved dispensing device is provided which evenly and accurately dispenses different types of products into various shaped receptacles, and which affords ease of repair and replacement of the augers and other equipment used in the described forming operation.

I claim as my invention:

1. In a dispensing device for discharging a measured quantity of a product in to a receptacle, the combination of, a hopper for holding a quantity of the product, a hollow spout supported to receive the product from the hopper and discharge it through a lower open end thereof, an auger removably supported for rotation within said spout, said auger being removable out through the lower end of the spout, drive means connected to rotate said auger for transmitting the product through said spout, a plate positioned between said auger and said lower open end of said spout transverse of the opening through the spout, said plate having an aperture therethrough having a cross-sectional area less than the flow area of said auger to restrict the free flow of the product through the auger, a hollow tube, means supporting said hollow tube with an upper end positioned to receive the product from the spout lower end and the other end positioned lower to discharge the product into the receptacle, a shaft journaled on said tube support means, a plurality of unbalanced weights releasably secured to said shaft, a motor connected through a flexible coupling to rotate said shaft for imparting a vibratory force through said support means to said tube whereby the unbalanced weights may be released from said shaft and repositioned angularly relative to one another to change the amplitude of the vibratory force for effecting a free flow of the product through said tube, and means supporting said hopper for pivoting between a first position where said spout alines with said tube to a second position away from said tube for ease of removal of said auger.

2. In a dispensing device for discharging a measured quantity of a product into a receptacle, the combination of, a hopper for holding a quantity of the product, a hollow spout supported to received the product from the hopper and discharge it through an open end thereof, an auger supported for rotation within said spout, drive means connected to rotate said auger for transmitting the product through said spout, said spout open end having a cross-sectional area less than the cross-section flow area of the auger to thereby restrict the free flow of the product through the auger, a hollow tube, means supporting said hollow tube with one end positioned to receive the product from the spout open end and the other end positioned to discharge the product into the receptacle, a shaft journaled on said tube support means, an unbalanced weight secured to said shaft, drive means for rotating said shaft to thereby generate a vibratory force which is transmitted through said tube support means to shake said tube for effecting an even flow of the product therethrough, and means for supporting said hopper for movement between a first position where said spout alines with said tube open end and a second position wherein said spout is moved away from said tube open end for ease of repair and adjustment of the dispensing device.

3. In a dispensing device for discharging a measured quantity of a product into a receptacle, the combination of, a hopper for holding a quantity of the product, a hollow spout supported in a substantially vertical position by the hopper and positioned to receive the product at the upper end from the hopper and discharge it through the lower open end, an auger supported for rotation in said hollow spout for transmitting the product therethrough, means for rotating the auger, a plate supported in the spout between the auger and the lower open end and transverse of the opening through the spout, an aperture in the plate having a cross-sectional area less than the flow area of the auger so as to restrict the flow of the product through the spout, a hollow tube supported to receive the product from the spout open end and transmit it to the receptacle, means for vibrating said hollow tube comprising a journaled shaft, a plurality of unbalanced weights attached to said shaft, drive means to rotate said shaft and generate a vibratory force, and means to transmit said vibratory force to said tube for shaking the tube and effecting an even flow of the product therethrough.

4. In a dispensing device for discharging a measured quantity of a product into a receptacle, the combination of, a hopper for holding a quantity of the product, a hollow spout supported by the hopper for receiving the product therefrom and discharging it through an open end therefrom, an auger supported for rotation within said spout, drive means connected to rotate said auger for transmitting the product through the spout, a plate supported between the lower end of the auger and the spout open end and positioned transverse of the opening through the spout, said plate having an aperture therethrough having a cross-sectional area less than the flow area of the auger, a frame including means supporting the hopper for pivoting between a first position in which the spout is alined with the receptacle for discharging the product into the receptacle and a second position where the spout is moved away from the receptacle for ease of repair and adjustment of the dispensing device.

5. In a dispensing device for discharging a measured quantity of a product into a receptacle, the combination of, a hopper for holding a quantity of the product, a hollow spout supported from the hopper and having a lower open end for discharging the product from the hopper, an auger supported for rotation within said spout, the lower end of the auger being disposed above the lower end of the spout, drive means connected to rotate said auger for transmitting the product through said spout, a plate supported between the auger and the spout open end and positioned transverse of the opening through the spout, said plate having an aperture therethrough having a cross-sectional area less than the flow area of the auger, a frame including means supporting the hopper for movement between a first position with the spout alined with the receptacle for discharging the product into the receptacle and a second position where the spout is moved away from the receptacle for ease of repair and adjustment of the dispensing device.

6. In a dispensing device for discharging a product into a receptacle the combination of, a hopper for holding a quantity of the product, a hollow tube supported to receive the product from the hopper and deliver it to the receptacle, a bracket having a projecting end supporting said tube, means for vibrating the tube including a bearing supported on the projecting end of said bracket, a shaft journaled in said bearing, a plurality of unbalanced weights, means releasably securing said weights to said shaft to permit angular adjustment of each about said shaft, and a motor connected for rotating said shaft and unbalanced weights for imparting a vibratory force to said tube through said bearing and bracket to effect a smooth flow of the product through the tube.

7. In a dispensing device for discharging a product into a receptacle, the combination of, a hopper for holding a quantity of the product, a spout positioned in communication with said hopper for discharging the product therefrom, a conduit positioned to receive the product from the spout and deliver it to the receptacle, means for vibrating the conduit including a bracket supporting said tube, a shaft journaled for rotation on said bracket, an unbalanced weight secured to said shaft, and a motor connected to rotate said shaft and said unbalanced weight for generating a vibratory force which is transmitted through said bracket to shake said conduit and effect a smooth flow of the product therethrough.

8. In a dispensing device for discharging a measured quantity of products into a receptacle, the combination of, a hopper disposed above the container for holding a quantity of the product, a hollow spout supported in communication with the hopper and having a lower open end positioned above the receptacle for delivering the product from the hopper to the receptacle, a frame including means for supporting said hopper, an augar rotatably supported in said spout and adapted to transfer the product through the spout when rotated, power means for rotating the auger, a plate having an orifice therethrough of less cross-sectional area than the cross-sectional flow area of the lower end of the auger, and means supporting said plate between the lower end of the auger and the open end of the spout and transverse of the opening through the spout whereby the plate restricts the free flow of the product through the auger and thereby makes the flow of the product from the hopper to the receptacle dependent upon the amount of the product transferred by rotation of the auger.

9. In a dispensing device for discharging a measured quantity of a product into a receptacle, the combination of, a hopper for holding a quantity of the product, a hollow spout having one open end positioned to receive the product from the hopper and having an opposite open end positioned to deliver the product to the receptacle, a frame including means for supporting said hopper, an auger supported for rotation in said spout for transmitting the product through the spout, power means for rotating the auger, and a flow restriction at the opposite open end of the spout having an aperture therethrough alined with the auger and having a cross-sectional area less than the cross-sectional flow area of said auger so as to restrict the free flow of the product therethrough thereby making the flow of the product from the spout to the receptacle dependent upon the amount of the product transmitted by rotation of the auger.

10. In a dispensing device for discharging a product into a receptacle, the combination of, a hopper disposed above the receptacle for holding a quantity of the product, a spout depending from said hopper to receive the product from the hopper and to deliver the product to the receptacle, a rotatable auger having an upper end disposed within said hopper and having a lower end telescoped into said spout, a frame disposed adjacent the receptacle, means supporting said hopper on said frame for tilting about a horizontal axis extending transversely of said auger between a first position in which the spout is alined with the receptacle to deliver the product to the receptacle, and a second position in which the spout is moved away from the receptacle to permit removal of said auger from the lower end of said spout without interference by the receptacle.

References Cited

UNITED STATES PATENTS

| | | | |
|---|---|---|---|
| 553,854 | 2/1896 | Hunter | 141—284 X |
| 1,398,790 | 11/1921 | Ogur | 222—164 X |
| 1,858,735 | 5/1932 | Goodsell | 141—284 X |
| 2,345,804 | 4/1944 | Gemberling et al. | 222—164 |
| 2,601,454 | 6/1952 | Peone | 141—256 X |
| 2,795,990 | 6/1957 | Bohlman et al. | 141—12 X |
| 2,923,574 | 2/1960 | Fuss et al. | 222—413 X |

LAVERNE D. GEIGER, *Primary Examiner.*

H. S. BELL, *Assistant Examiner.*